Aug. 13, 1957  F. K. BLOOM  2,802,756
WELD-ELECTRODE AND PRODUCT
Original Filed April 2, 1947
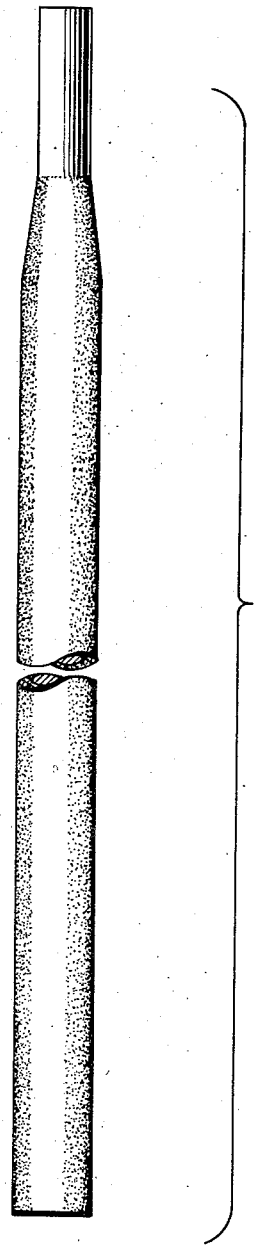
Cr 11.6% - 25.6%
Ni incidentals to 9.9%
Mn incidentals to 26.3%
C 0.16% - 2.19%
Iron remainder; with
Cr exceeding Ni+Mn; and
with %Cr (%Ni+.38(%Mn)
+7.5 (%C))= 116-189;
preferably = 122-189.
INVENTOR
Fredrick K. Bloom
BY
ATTORNEY

United States Patent Office 2,802,756
Patented Aug. 13, 1957

2,802,756

WELD-ELECTRODE AND PRODUCT

Fredrick Kenneth Bloom, Baltimore, Md., assignor to Armco Steel Corporation, a corporation of Ohio Continuation of application Serial No. 738,949, April 2, 1947. This application January 21, 1953, Serial No. 332,532

2 Claims. (Cl. 117—207)

This application is a continuation of my application Serial No. 738,949, filed April 2, 1947, and entitled Electrode and Deposit, now abandoned, and the invention relates to deposit welding, more especially to metal products having corrosion resistant thermally deposited facings and to a process and manufactures for giving the products.

Among the objects of my invention is the provision of a simple, direct and reliable method for producing hard facing deposits, as for example deposits on a plain carbon steel base, which deposits are initially soft when laid down and are extremely tough and which on the application of cold work become highly resistant to abrasion, particularly where abrasion associated with severe impact is of importance. The method is also well suited for giving corrosion resistant surfaced products, further having resistance to abrasion and heat as well as being crack resistant at the interface with the parent metal and in the body of the surfacing metal.

Other objects in part will be obvious and in part pointed out hereinafter.

The invention accordingly consists in the combination and proportionment of elements, composition of materials and features of construction, and in the several steps and the relation of each of the same to one or more of the others as described herein, the scope of the application of which is indicated in the following claims.

As conducive to a clearer understanding of certain features of my invention, it may be noted at this point that facings achieved by deposit surfacing or welding operations, where fulfilling a class of needs, represent an easy and economical means for keeping equipment in good operating condition and free of often repeated shut-down and repair or replacement of parts. Quite often, these facings are thermally deposited from a welding rod and onto a suitable metallic base, such as onto old or new carbon steel parts which require protection for reasons of intended use, and the facings amount to a surface, edge, point, or the like, which is better adapted for serving desired functions than the underneath metal. These facings, when hard, are in demand for fulfilling any of a wide variety of functions as where requirements include resistance to abrasion and impact. Hard facings originally were introduced on such products as metal working dies, oil well drilling tools, certain types of excavating equipment, and the like, but additional uses soon were found so that now the art of deposit welding is an important factor involved in many production and maintenance techniques, and in a large variety of specific industries and products.

An existing objection to many of the heretofore hard facings, however, is their susceptibility to corrosion; the rate of corrosion being so rapid where corrosive atmospheres, liquids or solids are encountered that initial cost of including the facing on a particular product is prohibitive. In producing certain of the prior art hard facings by deposit welding, the added metal has a strong tendency to crack at the interface formed with the base metal or between deposited beads of the weld. This detriment too frequently arises by reason of particular composition of the deposited metal. Some of the facings are highly susceptible to cracking because of hot-shortness, this too reverting back to composition of weld rod or electrode employed. The occurrence of cracking sometimes becomes so objectionable as to render further use of a given welding composition undesirable for hard facing purposes or is often responsible for losses in production or for costly replacement of parts because of failure or inadequacy of the cracked hard facing metal.

The matter of hardness of the deposited metal is frequently a limiting factor with regard to utility of the hard faced article or product; this is especially so where resistance to abrasion or scour is of considerable importance. It follows, however, that certain of the prior art hard facing materials serve well when exposed to wearing and operating influences, but fail far too readily where usage includes exposure to impact. There are occasions too where the hard facing metal is needed for fulfilling uses where the combined influences of abrasion and impact are brought into effect and where failure through a lacking resistance to either negatives utility.

An outstanding object of my invention accordingly is the provision of stainless steel hard facing rods which are readily produced as from the standpoint of producing the metal thereof and making the rods to desired content; also the production of strong and impact resistant stainless steel hard faced products which resist cracking, wear and abrasion.

Referring now more particularly to the practice of my invention, I provide metal products, as for example carbon steel products of low, medium, or even high carbon grade, having a strong and durable stainless steel facing. For depositing the facing, I frequently produce and employ a weld rod, illustratively an arc welding electrode, source of the facing metal. The stainless steel in the facing has a critical composition, and as initially deposited is substantially fully austenitic considering too that carbides may be present without detriment. A small amount of ferrite usually exists in the facing composition and is believed to contribute somewhat to the prevention of cracking. Further, the initially deposited metal is soft, but the austenite by reason of having a tendency toward instability, readily transforms to martensite when the metal is subjected to cold working as might be encountered during use. The cold working or work hardening gives a hard, corrosion-resistant skin on the facing which resists abrasion; the underlying portion of the facing metal remains relatively soft, but is tough and highly resistant to impact. I rely upon the conditions of use to achieve the work-hardened surface, thus developing a hard, abrasion-resistant skin or facing.

For the reason that losses sometimes occur in welding and facing operations, the composition of the facing rod which I provide is given in terms of the facing desirably obtained. The rod or electrode is of such composition as to yield a deposit of facing alloy, comprising about 10% to 22% chromium, nickel from small and fractional percentages under 1% and ranging up to about 9%, from small or incidental amounts up to approximately 18% manganese, about 0.10% to 1.5% carbon, and the remainder substantially all iron. At the same time, however, I restrict the amounts of chromium, nickel, manganese and carbon in the rod to amounts which ensure that the ratio or relationship of these elements in the hard facing obtained is substantially consistent with the following empirical formula:

$$\text{Percent Cr}\left(\text{Percent Ni} + \frac{\text{Percent Mn}}{2} + 10\,(\text{Percent C})\right)$$

= a numerical value exceeding approximately 95 minimum. The numerical values preferably range between 100 and 155. As the minimum numerical value of the formula is approached from the high side, the austenitic quality of the facing tends to disappear and the property of initial softness suffers. An excessive increase in alloy content of the facing, away from the minimum numerical value of the formula impairs the work hardening characteristics.

The welding rod preferably includes a coated stainless steel wire core having contents of the core and coating sufficient, in view of possible losses while forming the deposit to give a facing composition of the character hereinbefore described which satisfies the formula. I find considerable advantage in making the core from any one of the standard types of stainless steels noted below in Table I, any of these being readily provided and illustratively hot worked to desired size and shape.

TABLE I

| Standard Type No. | Percent | | | | | | |
|---|---|---|---|---|---|---|---|
| | C | Cr | Ni | Mn | Si | S | P |
| 301 | over 0.08–0.20 | 16.00–18.00 | 6.00–8.00 | 2.00 Max. | 1.00 Max. | 0.04 Max. | 0.04 Max. |
| 410 | 0.15 Max. | 11.50–13.50 | | 1.00 Max. | 1.00 Max. | 2.04 Max. | 0.04 Max. |
| 414 | 0.15 Max. | 11.50–13.50 | 1.25–2.50 | 1.00 Max. | 1.00 Max. | 0.04 Max. | 0.04 Max. |
| 420 | 0.15 Min. | 12.00–14.00 | | 1.00 Max. | 1.00 Max. | 0.04 Max. | 0.04 Max. |
| 430 | 0.12 Min. | 14.00–18.00 | | 1.00 Max. | 1.00 Max. | 0.04 Max. | 0.04 Max. |
| 431 | 0.20 Max. | 15.00–17.00 | 1.25–2.50 | 1.00 Max. | 1.00 Max. | 0.04 Max. | 0.04 Max. |
| 440-A | 0.60–0.75 | 16.00–18.00 | | 1.00 Max. | 1.00 Max. | 0.04 Max. | 0.04 Max. |
| 440-B | 0.75–0.95 | 16.00–18.00 | | 1.00 Max. | 1.00 Max. | 0.04 Max. | 0.04 Max. |
| 440-C | 0.95–0.120 | 16.00–18.00 | | 1.00 Max. | 1.00 Max. | 0.04 Max. | 0.04 Max. |
| 442 | 0.35 Max. | 18.00–23.00 | | 1.00 Max. | 1.00 Max. | 0.04 Max. | 0.04 Max. |

I coat the core with flux as by continuously feeding a wire of the core metal through a suitable flux extruding die, and extruding on the flux mixed with a suitable binder. The coating preferably is substantially free of hydrogen-yielding constituents, and illustratively includes a dehydrated mineral slag-forming material having a composition of the character more particularly set forth in the copending George E. Linnert application, Serial No. 565,573, filed November 28, 1944, now U. S. Letters Patent No. 2,544,334 of March 6, 1951. For building up the rod composition, I sometimes add amounts of any needed elements to the coating, as for example amounts of manganese and carbon in the form of powdered ferromanganese or chromium and nickel in the form of chromium-nickel ferroalloy. Powdered graphite sometimes is introduced in the coating as a source of carbon. The materials conveniently are applied in mixture with the flux to the core. At times, the coating is substantially all flux, the core for example in this instance being the entire source of metal, or even at times I use the cores, as rods, without the flux coating.

When the protection from oxidation is reasonably good, the recoveries which may be expected from the several alloy ingredients mentioned above are approximately as follows: Carbon 75%, chromium 95%, nickel 100%, manganese 75%. The dilution had in laying down a facing on a mild steel backing averages about 25%.

It is seen from calculation that the weld rod or electrode composition comprises, in total, about 11.6% to 25.6% chromium, nickel up to about 9.9%, manganese up to about 26.3%, about 0.16% to 2.19% carbon, and the remainder substantially all iron. In addition, the amount of chromium, nickel, manganese and carbon are found restricted to a relationship which expressed in terms of the weld rod or electrode composition, is as follows: percent Cr (percent Ni+.38 (percent Mn)+7.5 (percent C))=a numerical value in excess of 116, and preferably ranging between 122 and 189.

The austenitic work hardenable or martensitic work hardened deposits or facings on the metal products which I achieve, therefore, in view of the nature of the source of the deposit metal, have a stainless steel composition falling within the broad percentage ranges of ingredients given hereinbefore and also within the formula ratio limits already noted. In producing the stainless steel facings, the deposited metal by reason of critical composition resists cracking at the interface with the mild carbon steel base. As a matter of further importance, the facing, where produced by depositing beads of the stainless steel as by electric arc-welding methods, resists cracking at the points of interbeading and also resists cracking in use when hot or cold. I usually maintain a minimum of such residual elements as sulphur and phosphorus in the electrodes and in the facings obtained, for enhancing the resistance to cracking. The dehydrated mineral flux coating which I prefer to use contributes to freedom from cracking.

My stainless steel facings having the work-hardened surface or skin, resists wear, abrasion, cracking, corrosion and severe impact and have many other valuable properties for meeting a large variety of uses. Among these uses are those where the hard faced products are exposed to heavy wear or continuous abrasion under high pressure or impact, particularly in locations where exposure to moisture, damp air, chemicals, gases and other corrosive substances are encountered, or where frequent replacement of machinery parts would be expensive and uneconomical. Several of my hard faced products take the form of gears, pinions, slides and guides for machinery such as engines handling gravel, rocks, and other impact-producing materials as in mining machinery where severe abrasion and acid, or chemical-laden waters are present. Also, I produce hard faced products, which are useful where high velocity liquids laden with solids are contacted. Parts for pumps and suction dredges are among the latter products. In certain instances the products which I achieve fall into a class affording prolonged life, and where the life is extended indefinitely by renewing the hard facing from time to time. Other products are highly impact resistant plow shares and steam shovel teeth for rocky soils, crusher rolls, liners and balls for ball mills where heavy hard materials are being ground, pulverizer hammers, scarifier teeth for road building and maintenance machinery, and power clutches and clutch parts for resisting impact, wear and the like. A great number of other products of course could be named; however, for purposes of illustration it is believed that the above will suffice.

As illustrative of the practice of my invention, I provide an arc welding electrode having a core and a coating, in which electrode or manufacture the carbon, chromium, nickel and manganese are present in such amounts as to yield a deposited facing containing these elements in accordance with any one of the compositions noted below in Table II or in any other proportions consistent with the general composition ranges and formula hereinbefore set forth. The table relates to facings which contain carbon, chromium, nickel and manganese, only very small amounts of such elements as sulphur and phosphorus, and the remainder substantially all iron. Hardness values as are noted in the instance of such composition, respectively correspond to the soft deposited condition of the facing and to the subsequent work-hardened condition of the surface or skin of the facing metal.

TABLE II

*Hard facing compositions*

| No. | Facing Deposit | | | | Formula Ratio | Rockwell Hardness of Deposit | |
|---|---|---|---|---|---|---|---|
| | C | Cr | Ni | Mn | | Soft Deposited | Work Hardened |
| 1 | 0.445 | 15.68 | 1.99 | 0.72 | 107 | C 20 | C 44–50 |
| 2 | 0.660 | 15.48 | 1.99 | 0.74 | 153 | C 27 | C 50–52 |
| 3 | 0.310 | 15.15 | 1.83 | 3.90 | 103 | C 19 | C 42–48 |
| 4 | 0.460 | 15.15 | 1.83 | 3.60 | 124 | C 18 | C 43 |
| 5 | 0.138 | 14.70 | 1.78 | 7.33 | 100 | C 21 | C 51–52 |
| 6 | 0.174 | 14.73 | 1.78 | 7.33 | 104 | C 20 | C 44–51 |
| 7 | 0.214 | 14.64 | 1.78 | 6.92 | 107 | C 18 | C 45–50 |
| 8 | 0.306 | 14.70 | 1.78 | 7.13 | 109 | C 18 | C 41–45 |

The compositions of the electrodes or weld rods employed in laying down the facing deposits set forth in Table II are given below:

TABLE III

*Weld rod compositions*

| No. | C | Cr | Ni | Mn | Formula Ratio |
|---|---|---|---|---|---|
| 1 | .65 | 18.19 | 2.19 | 1.05 | 136 |
| 2 | .96 | 17.95 | 2.19 | 1.08 | 175 |
| 3 | .45 | 17.57 | 2.01 | 5.69 | 132 |
| 4 | .67 | 17.57 | 2.01 | 5.26 | 159 |
| 5 | .25 | 17.05 | 1.96 | 10.70 | 135 |
| 6 | .24 | 17.09 | 1.96 | 10.70 | 133 |
| 7 | .31 | 17.00 | 1.96 | 10.10 | 138 |
| 8 | .45 | 17.05 | 1.96 | 10.41 | 159 |

For best results the surface of the parent metal for receiving the deposit is cleaned of all loose scale, dirt, rust or other foreign substances, this by pickling, grinding, machining, wire brushing or the like. Then by bead deposit welding or any other satisfactory procedure, I employ the electrode for building up a facing on the clean metal surface, the surface illustratively being that of a pre-formed plain carbon steel or high alloy steel product. The amount of current used with the electrode is for example in the range of 140 to 160 amperes. I apply enough metal and then hot file and grind or otherwise effect size. As deposited and cooled, the metal is relatively soft, which property often contributes ease to shaping and sizing the product. I put the relatively soft surfaced products into use where the conditions of use supply the work hardening treatment and the consequent development of the abrasion-resistant skin.

Facings of exceptionally durable and lasting quality are obtained on products of high alloy or low alloy steel, or on other metals or alloys, through the use of my electrodes. Sometimes, I deposit the facings on hardening steels or even on hardened steels. Quite often the metal base receiving the facing is not materially responsive to hardening heat treatment, or for other reasons is kept in the unhardened condition.

Thus it will be seen that in this invention there are provided a fusible welding rod, a method of producing facings and faced products, and the faced products themselves, in which the various objects noted, together with many thoroughly practical advantages are successfully achieved. It will be seen that the rods or electrodes are of such metallic contents as to give lasting, impact-resistant hard facings which are strong, resistant to cracking and also resistant to abrasion and corrosion.

As many possible embodiments may be made of my invention and as many changes may be made in the embodiments hereinbefore set forth, it is to be understood that all matter described herein is to be interpreted as illustrative and not as a limitation.

I claim as my invention:

1. A hard facing electrode for the production of a facing which is initially soft as deposited but which readily transforms to martensite upon cold-working comprising a metal core and a coating thereon, said core and coating in total essentially consisting of about 11.6% to 25.6% chromium, nickel incidentals up to about 9.9%, manganese incidentals up to about 26.3%, about 0.16% to 2.19% carbon, with the chromium content exceeding the sum of the nickel and manganese contents and with the relationship between the chromium, nickel, manganese and carbon contents further restricted to the relationship between empirical formula: percent chromium (percent nickel +.38 (percent manganese)+7.5 (percent carbon))=a numerical value in excess of 116 but not exceeding 189, and the remainder substantially all iron.

2. A hard facing electrode for the production of a facing which is initially soft as deposited but which readily transforms to martensite upon cold-working comprising a stainless steel core, and a dehydrated mineral flux coating for the core, said core and coating together essentially consisting of about 11.6% to 25.6% chromium, nickel up to about 9.9%, manganese up to about 26.3%, about 0.16% to 2.19% carbon, with the chromium content exceeding the sum of the nickel and manganese contents and with the relationship between the chromium, nickel, manganese and carbon contents further restricted to the relationship between empirical formula: percent chromium (percent nickel +.38 (percent manganese)+7.5 (percent carbon))=a numerical value between 122 and 189, and the remainder substantially all iron.

References Cited in the file of this patent

UNITED STATES PATENTS

| 1,893,160 | Clarke | Jan. 3, 1933 |
| 2,050,043 | De Golyer | Aug. 4, 1936 |
| 2,156,298 | Leitner | May 2, 1939 |
| 2,156,299 | Leitner | May 2, 1939 |
| 2,156,307 | Rapatz | May 2, 1939 |
| 2,240,672 | Scherer | May 6, 1941 |
| 2,436,867 | Lee | Mar. 2, 1941 |